United States Patent
Soulier et al.

(10) Patent No.: US 9,767,117 B2
(45) Date of Patent: *Sep. 19, 2017

(54) METHOD AND SYSTEM FOR EFFICIENT WRITE JOURNAL ENTRY MANAGEMENT FOR A DISTRIBUTED FILE SYSTEM

(71) Applicant: NetApp, Inc., Sunnyvale, CA (US)

(72) Inventors: Paul E. Soulier, Colorado Springs, CO (US); Brad D. Besmer, Colorado Springs, CO (US)

(73) Assignee: NetApp, Inc., Sunnyvale, CA (US)

(*) Notice: Subject to any disclaimer, the term of this patent is extended or adjusted under 35 U.S.C. 154(b) by 1162 days.

This patent is subject to a terminal disclaimer.

(21) Appl. No.: 13/896,186

(22) Filed: May 16, 2013

(65) Prior Publication Data

US 2013/0268492 A1    Oct. 10, 2013

Related U.S. Application Data

(63) Continuation of application No. 10/973,478, filed on Oct. 26, 2004, now Pat. No. 8,458,238.

(51) Int. Cl.
*G06F 17/30* (2006.01)

(52) U.S. Cl.
CPC .. *G06F 17/30191* (2013.01); *G06F 17/30194* (2013.01)

(58) Field of Classification Search
None
See application file for complete search history.

(56) References Cited

U.S. PATENT DOCUMENTS

| | | | |
|---|---|---|---|
| 4,507,751 | A | 3/1985 | Gawlick et al. |
| 5,550,975 | A | 8/1996 | Ichinomiya et al. |
| 5,590,276 | A | 12/1996 | Andrews |
| 5,819,109 | A | 10/1998 | Davis |
| 5,948,110 | A | 9/1999 | Hitz et al. |
| 6,327,645 | B1 | 12/2001 | Hsiao et al. |
| 6,591,264 | B1 | 7/2003 | Humlicek |
| 6,714,951 | B2 | 3/2004 | Bills et al. |
| 6,725,392 | B1 | 4/2004 | Frey et al. |
| 6,883,083 | B1 | 4/2005 | Kemkar |
| 2003/0160893 | A1 | 8/2003 | Greenfield et al. |
| 2003/0187847 | A1 | 10/2003 | Lubbers et al. |
| 2004/0128587 | A1 | 7/2004 | Kenchammana-Hosekote et al. |
| 2005/0081099 | A1 | 4/2005 | Chang et al. |

FOREIGN PATENT DOCUMENTS

EP    0551009 A2    7/1993

*Primary Examiner* — Bai D. Vu
(74) *Attorney, Agent, or Firm* — Haynes and Boone, LLP; Thomas Kelton; R. Whitman Burns

(57) ABSTRACT

The present invention is directed to a method and system for efficient write journal entry management maintaining minimum write journal information stored in a nonvolatile memory through utilizing an additional structure in a fast volatile memory. The method and system may manage write journaling of a file volume including multiple fixed sized regions and assign a persistent 1-bit synchronization status (the write journal information) to each data region. In addition, a non-persistent I/O counter (the additional structure) for each region to manage the persistent 1-bit synchronization status during run-time. The present invention may provide a mechanism to determine when write I/O operations have not successfully completed to a specific region of the file volume.

20 Claims, 2 Drawing Sheets

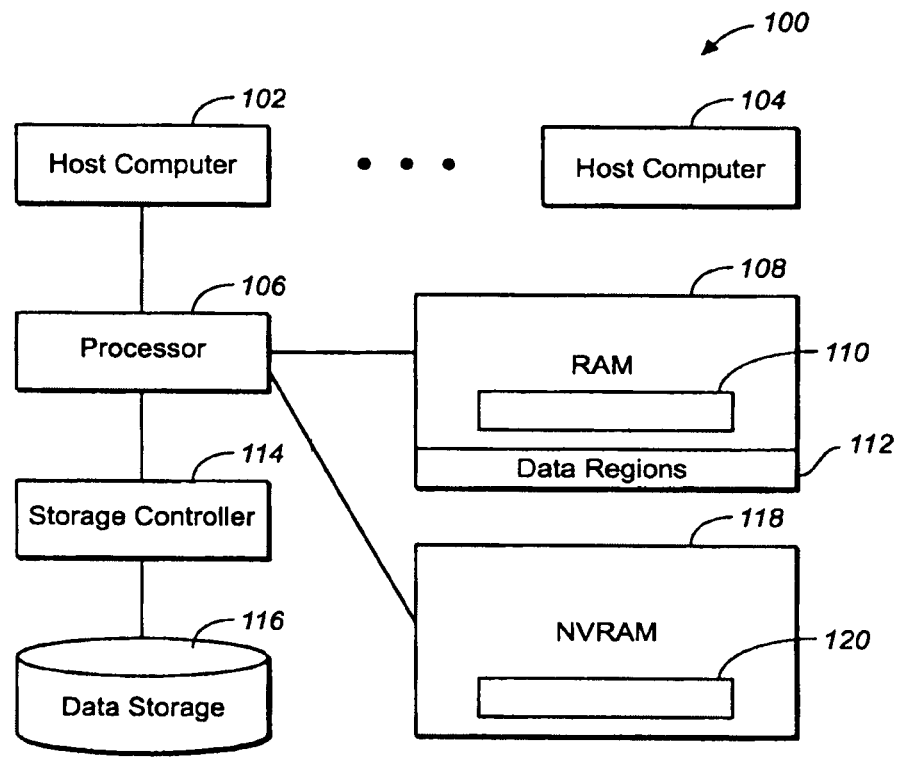
FIG._1
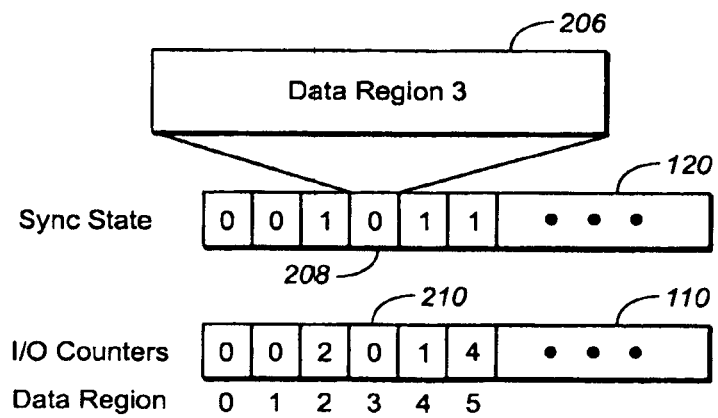
FIG._2

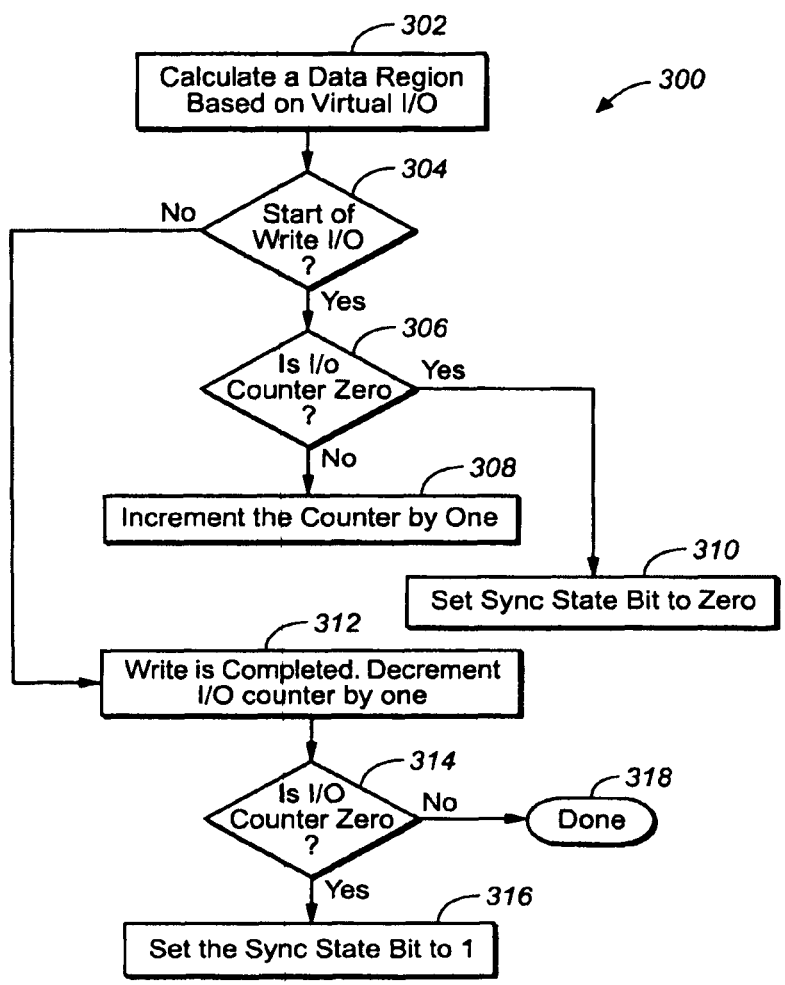
FIG._3

METHOD AND SYSTEM FOR EFFICIENT WRITE JOURNAL ENTRY MANAGEMENT FOR A DISTRIBUTED FILE SYSTEM

CROSS REFERENCES

This application is a continuation application of U.S. application Ser. No. 10/973,478, filed Oct. 26, 2004 entitled: "Method and System for Efficient Write Journal Entry Management For A Distributed File System", the entire disclosure of which is incorporated herein by reference.

FIELD OF THE INVENTION

The present invention generally relates to the field of file system management, and particularly to file system management for efficient write journal entries.

BACKGROUND OF THE INVENTION

An effective storage subsystem is a critical concern in the computer system industry. One of the most favored storage subsystems to achieve fault tolerance and enhance data availability may be redundant arrays of independent disks or redundant arrays of inexpensive disks (RAID) systems. Fault tolerance in a storage subsystem is generally achieved either by disk mirroring or by parity encoding, which various levels of RAID may provide.

It is well known to the art that "write journaling" has been utilized by RAID systems. Generally, "write journaling" refers to the concept of having a file system write a 'diary' of information to the disk in such a way as to allow the file system to be quickly restored to a consistent state after a power failure or other unanticipated hardware/software failure. A journaled RAID system can be brought back on-line quickly after a system reboot, and, as such, is a vital element of building a reliable, available storage solution. Further, file volumes in a distributed system (e.g RAID system or the like) are often modified in different manners by various host computers. Ensuring the synchronization is important to provide data integrity over the distributed file system. Thus, some RAID system may log (store) write journal information in non-volatile random access memory (NVRAM) to ensure the synchronization of a file volume is maintained and to restore the file volume after unexpected system interruptions or failures.

However, the conventional "journaling" method utilized by RAID systems has inherent problems. As described above, in order to ensure that write journal information is not lost due to unexpected system interruptions or failures, the write journal information is stored in some form of non-volatile memory (e.g. NVRAM or the like). However, storage on most non-volatile memories is limited and thus it is undesirable to store large amount of write journal information on non-volatile memories. Further, access to certain types of non-volatile memory may be slow. Thus, it is preferable to reduce the number of read/write operations to such non-volatile memories. In particular, the RAID system prevents the host from reading data that is not yet synchronized since erroneous information may be returned to the host computer. Thus, when the RAID system with write journaling is initialized, write journal entries may need to be processed to restore the file volume's synchronization. In such a case, host read I/O command may be blocked while the write journal is processed.

Conventionally, there are numerous approaches to resolve the above-mentioned problems. One example may be an approach to store the write I/O's virtual Logical Block address (LBA) and the number of sectors to write prior to each write operation. This data (write journal data) is then cleared upon the write operation. This approach may not be desirable for a system where non-volatile memory (e.g. NVRAM or the like) is very limited. For example, write journal data may require 8 bytes of data for each outstanding write I/O for a 10 byte SCSI command. Thus, if 64 write operations are permitted to be outstanding, this would require 521 bytes of non-volatile random memory access (NVRAM). The more I/O's that are required to be outstanding, the more NVRAM is required. In the above example, each write I/O would require 12 write accesses to NVRAM-8 bytes upon receipt of the host write operation and a 4 byte write to mark the write journal as complete. On a system where process time is critical, 12-byte write accesses for each write I/O may incur an unacceptable time penalty.

As such, current methods for dealing with this require every write journal entry to be processed before allowing any host read I/O's to be issued. If the number or size of write journal entries is large, this can take an unacceptably long period to complete. Other methods may use multiple structures to identify regions that need to be corrected by a write journal entry. This may not be acceptable as well due to the amount of additional memory required.

Therefore, it would be desirable to provide a method and system to overcome above mentioned drawbacks of current write journaling methods.

SUMMARY OF THE INVENTION

Accordingly, the present invention provides a method and system for efficient write journal entry management for a distributed file system wherein the method and system utilizes an additional structure in a fast volatile memory in order to maintain minimum write journal information stored in a nonvolatile memory.

In a first aspect of the present invention, a system for efficient write journal entry management of an array of storage devices is provided. The system may comprise a processor configured to receive a command to access a virtual file volume from host computers over a network. The virtual file volume may be divided into multiple data regions with a fixed size. The system may comprise fast random access memory for storing I/O counters for the multiple data regions. Each I/O counter may include information of how many host write operations are outstanding for a corresponding data region. Non-volatile random access memory (NVRAM) coupled to the processor may be utilized to keep write journal information for the multiple data regions. The non-volatile random access memory area may include a string of bits named as a Sync State. Each bit of the Sync State representing a sync status ("synchronized" or "not synchronized") of a corresponding data region among the multiple data regions. The Sync State may be managed through I/O counters during runtime.

In a second aspect of the present invention, a method of efficient write journal entry management for a distributed file system is provided. The method of the present invention may receive a virtual write I/O command issued from a host. A current data region may be calculated (defined) based on the received virtual write I/O command. The distributed file system may manage a virtual file volume which is broken up into multiple fixed sized data regions. Each data region has two possible states including "synchronized" and "not synchronized." A Sync State includes a string of bits, each of which represents previous state of a corresponding data region. The Sync State may be stored in the NVRAM for fault recovery of the distributed file system. If a bit of the Sync State has been set to "0", then the associated data region may not be synchronized yet. The associated data region may be restored by file volume synchronization. If a bit of the Sync State has been set to "1", then the associated data region is synchronized.

The method may determine whether a start of write I/O for the data region is commenced. An I/O counter associated with the current data region may be retrieved from a volatile memory. In case of the start of write I/O, whether the I/O counter associated with the data region is zero may be determined. Then, if the I/O counter associated with the data region is zero, an associated bit from a Sync State may be set to "0" indicating that the current data region is no longer synchronized. Otherwise, the I/O counter may be incremented by one. The method may determine whether the write I/O for the data region has been completed. In case of the completion of write I/O, the I/O counter associated with the data region may be decremented by one. Then whether the I/O counter associated with the data region is zero may be determined. If the I/O counter associated with the data region is zero, then the associated bit from the Sync State may be set to "1" indicating there is no outstanding I/O operation to the data region.

In an advantageous aspect of the present invention, NVRAM may be utilized to keep write journal information but the necessary amount of NVRAM dedicated to store the write journal information may be minimized. In another advantageous aspect of the present invention, the number of read/write operations to NVRAM may be reduced. Further, the present invention may eliminate additional memory for managing which volume regions need to block host read I/Os while the write journal is processed.

It is to be understood that both the foregoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which:

FIG. 1 is a block diagram illustrating a computer system capable of implementing a method and system in accordance with an exemplary embodiment of the present invention;

FIG. 2 is an illustration of a structure utilized by the computer system shown in FIG. 1; and FIG. 3 is a flow diagram illustrating a method of the present invention.

DETAILED DESCRIPTION OF THE INVENTION

Reference will now be made in detail to the presently preferred embodiments of the invention, examples of which are illustrated in the accompanying drawings.

The present invention provides a method and system for efficient write journal entry management for a distributed file system wherein the method and system utilizes an additional structure in a fast volatile memory in order to maintain minimum write journal information stored in a nonvolatile memory. In the following description, numerous specific descriptions are set forth in order to provide a thorough understanding of the present invention. It should be appreciated by those skilled in the art that the present invention may be practiced without some or all of these specific details. In some instances, well known process operations have not been described in detail in order to prevent any obscurity in the present invention.

Referring generally now to FIGS. 1 through 3, exemplary embodiments of the present invention are shown.

Referring now to FIG. 1, a block diagram illustrating a computer system 100 in accordance with the present invention is shown. The computer system 100 may comprise a processor 106 coupled to host computers 102-104, Random Access Memory (RAM) 108, Non Volatile RAM 118, a storage controller 114, a data storage 116 and the like. The processor 106 is configured to receive virtual I/O commands from various host computers 102-104. The virtual I/O command may include a virtual write I/O command, a virtual I/O read command or the like. A storage controller 114 coupled to the processor 106 may be configured to control physical data storage. The processor is coupled to the RAM 108 (which is volatile but fast) and the NVRAM 118 (which is non-volatile but slow). The NVRAM 118 may be utilized to store information for a recovery process, synchronization information, or the like.

In a particular embodiment of the present invention, a virtual file volume (e.g. a RAID volume or the like) is manipulated by the processor 106. The virtual file volume may be broken up into multiple data regions. The computer system 100 may maintain minimum write journal entry information in the NVRAM 118 through utilizing a structure containing write journal information, which may be divided into two halves 110, 120. One half 120 contains data to be stored in the NVRAM 118 and the other 110 contains data that can be kept in the RAM 108. Conventionally, a write journal entry for each data region may be logged (stored) in the NVRAM 118 in order to ensure that the write journal entry information is not lost due to unexpected system interruptions. For example, conventional file recovery systems such as RAID systems often utilize NVRAM to store a virtual logical block address of a write I/O and number sectors to write prior to each write operation. However, such file recovery systems may require more NVRAM capacity for more outstanding I/O commands. Further, several transactions (accesses) over NVRAM may slow down read and write operations and thus incur a time penalty. In an embodiment of the present invention, the necessary amount of NVRAM dedicated to store the write journal information may be minimized through utilizing two halves 110, 120 of the structure containing write journal information.

Referring now to FIG. 2, two halves 110, 120 of the structure containing write journal information in accordance with the present invention is shown. In a particular embodiment of the present invention, a virtual file volume may be divided into multiple fixed sized data regions. Each data region may have two possible states such as "synchronized" and "not synchronized." Each data region may be associated with a single bit representing its previous two states. One half (identified as a Sync State) 120 may include a collection of such bits. The Sync State 120 may be stored in the NVRAM and preferably, the number of bits of the Sync State 120 may be configurable to be adjusted to the amount of given NVRAM.

For example, a current data region 206 may be a data region 3 with "not synchronized" state. A corresponding bit 208 of the Sync State 120 may be set to zero indicating the data region 3 is not synchronized. The data region which is not synchronized may not be allowed to be read from host computers since erroneous information may be returned to the host. The present invention may correct the problem (possible out-of-sync) by restoring volume synchronization. One of ordinary skill in the art will appreciate that there are various way to restore synchronization of a data region (a data block) in a RAID system.

The other half 110 of the structure may be an array of I/O counters stored in the RAM for a fast access. In the particular embodiment, each data region may have a corresponding I/O counter from an I/O counters array 110. Each I/O counter may indicate how many host write operations are outstanding to the corresponding region. For example, I/O counters array [3] 210 may have "0" value indicating that zero number of write operation for the current data region (data region 3) 206 is outstanding. As such, the I/O counters array 110 may be utilized during runtime to manage the Sync State 120.

In an embodiment of the present invention, when a host computer issues a command for a virtual write I/O operation, a current data region may be calculated. Based on the calculated current region, the corresponding I/O counter for the current data region may be examined. If the I/O counter is zero, then the corresponding bit of Sync State may be cleared (set to be zero) to indicate that one or more write I/Os are pending for the data region. In other words, the current region is potentially out-of-sync. If the I/O counter is greater than zero, it is not necessary to access the NVRAM to update the corresponding bit of the Sync State. After the write I/O operation is completed, the correct region may be calculated again based on the result of write I/O operation. Then, the corresponding I/O counter of the data region may be decremented indicating an outstanding write I/O operation is completed. If the corresponding I/O counter of the data region reaches zero, the corresponding bit of the Sync State in the NVRAM may be updated to be set to "1" to indicate that all write I/O commands for this region have been completed and thus the region is known to be synchronized.

Referring to FIG. 3, a flow diagram 300 illustrating a method of efficient journal entry through utilization of the I/O counter array and the Sync State is shown. The method begins in step 302 in which a current data region is calculated based on a virtual I/O command from a host computer. The virtual write I/O command may be issued from a host computer over the network. Then the current data region may be calculated (defined) based on the virtual write I/O command. In a particular embedment, the distributed file system may manage a virtual file volume which is broken up into multiple fixed sized data regions. Each data region has two possible states including "synchronized" and "not synchronized." A Sync State includes a string of bits which of each represents previous state of a corresponding data region. The Sync State may be stored in the NVRAM for fault recovery of the distributed file system. If a bit of the Sync State is zero, then the associated data region may not be synchronized yet. The file recovery system must correct the associated data region to restore volume synchronization. If a bit of the Sync State is one, then the associated data region may have been synchronized already.

In Step 304, the method 300 may determine whether a start of write I/O for the current data region is commenced. An I/O counter associated with the current data region may be retrieved form a volatile memory. Then, in step 306, whether the I/O counter associated with the data region is zero may be determined. If the I/O counter associated with the data region is zero, an associated bit of the Sync State may be set to "0" indicating that the current data region is no longer synchronized in Step 310. Otherwise, the I/O counter may be incremented by one in step 308.

In Step 312, after the write I/O for the data region has been completed, the I/O counter associated with the data region may be decremented by one. Then, whether the I/O counter associated with the data region is zero may be determined in Step 314. If the I/O counter associated with the data region is zero, then the associated bit from the Sync State may be set to "1" indicating there is no outstanding I/O operation to the data region in Step 316. If the I/O counter associated with the data region is not zero, then the method is done in Step 318.

In an advantageous aspect of the present invention, the NVRAM may be utilized to keep write journal information but the necessary amount of the NVRAM dedicated to store the write journal information may be minimized. Further, the amount of write journal information may be configurable to be adjusted based on an available NVRAM. In another advantageous aspect of the present invention, the number of read/write access to the NVRAM may be reduced. Generally, the number of data regions that are out-of sync due to incomplete write I/O operations may be small and therefore the process of correcting out-of-sync data region may affects only a small portion of the volume. The method and system of the present invention may detect overlaps between a host read operation and the data region that may not be in sync by checking the I/O counters array. Consequently, the current data region may be restored without delaying all host read I/O commands if the current data region is potentially out-of-sync. Further, the present invention may eliminate additional memory for managing which volume regions need to block host read I/O commands while the write journal is processed.

In the exemplary embodiments, the methods disclosed may be implemented as sets of instructions or software readable by a device. Further, it is understood that the specific order or hierarchy of steps in the methods disclosed are examples of exemplary approaches. Based upon design preferences, it is understood that the specific order or hierarchy of steps in the method can be rearranged while remaining within the scope and spirit of the present invention. The accompanying method claims present elements of the various steps in a sample order, and are not necessarily meant to be limited to the specific order or hierarchy presented.

It is believed that the method and system of the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described is merely an explanatory embodiment thereof, it is the intention of the following claims to encompass and include such changes.

What is claimed is:

1. A method for efficient write journal entry management for a distributed file system, comprising:
receiving a virtual write I/O command issued from a host;
retrieving an I/O counter associated with a data region, wherein the I/O counter indicates an amount of outstanding host write operations for the data region, and wherein the I/O counter is included in an array of I/O counters;

utilizing the I/O counter to manage a corresponding bit from a Sync State, the Sync State having a plurality of bits, each of the plurality of bits represent a sync status of a corresponding data region; and
writing data via write I/O, wherein the I/O counter is stored in a first memory unit and the Sync State is stored in a second memory unit.

2. The method of claim 1, the utilizing of the I/O counter further comprising:
in case of the start of write I/O, checking whether the I/O counter associated with the data region is zero;
if the I/O counter associated with the data region is zero, setting the corresponding bit from the Sync State to "0" indicating that the data region is no longer synchronized; and
if the I/O counter associated with the data region is not zero, incrementing the I/O counter by one.

3. The method of claim 1, the utilizing of the I/O counter further comprising:
determining whether write I/O for the data region has been completed;
in case of the completion of write I/O, decrementing the I/O counter associated with the data region by one, and determining whether the I/O counter associated with the data region is zero after I/O counter is decremented; and
if the I/O counter associated with the data region is zero, setting the corresponding bit from the Sync State to "1" indicating there is no outstanding I/O operation to the data region.

4. The method of claim 1, wherein the data region is one of a plurality of data regions in which a virtual file volume is divided.

5. The method of claim 4, wherein the virtual file volume is utilized in a file recovery system.

6. The method of claim 4, wherein each of the plurality of data regions has two possible states including "synchronized" and "not synchronized".

7. The method of claim 4, wherein the array of I/O counters is stored in a volatile memory unit.

8. The method of claim 4, wherein each of the plurality of data regions is associated with a bit of the Sync State representing previous state.

9. The method of claim 1, wherein the Sync State is utilized for a file system recovery of system interruptions.

10. A computing device comprising:
a memory; and
at least one processor coupled to the memory, the at least one processor to:
maintain an array of I/O counters in a first memory unit, wherein each I/O counter included in the array of I/O counters indicates an amount of outstanding host write operations for a corresponding data region within a plurality of data regions;
maintain a plurality of sync state bits in a second memory unit, each of the plurality of sync state bits representing a sync status of a corresponding data region within the plurality of date regions; and
change a sync state bit for a particular data region to show a synchronized status for the particular data region in response to decrementing a particular one of the I/O counters to zero outstanding I/O operations for the particular data region.

11. The computing device of claim 10, wherein the array of I/O counters are implemented in volatile memory.

12. The computing device of claim 10, wherein the sync state bits are stored in non-volatile memory.

13. The computing device of claim 10, the processor further to:
synchronize a file volume, the file volume comprising the plurality of data regions, to recover from a system interruption.

14. The computing device of claim 10, the processor further to:
receive a virtual I/O command from a host computer, wherein the I/O command is to be written to the particular data region;
retrieve the particular one of the I/O counters in response to receiving the virtual I/O command;
set the sync state bit for the particular data region to a value indicating that the particular data region is no longer synchronized in response to receiving the virtual I/O command and in response to determining that the particular one of the I/O counters shows zero outstanding I/O operations; and
increment by one the particular one of the I/O counters in response to determining that the particular one of the I/O counters shows a non-zero number of outstanding I/O operations.

15. A system for efficient write journal entry management of an array of storage devices suitable for being accessed by a plurality of host computers over a network, the system comprising:
a processor to receive a command to access a virtual file volume, wherein the virtual file volume includes a plurality of data regions;
a first memory unit coupled to the processor, the first memory unit including an array of I/O counters, wherein each I/O counter included in the array of I/O counters indicates an amount of outstanding host write operations for a corresponding data region included in the plurality of data regions;
a second memory unit coupled to the processor, the second memory unit including a plurality of sync state bits, each of the plurality of sync state bits representing a sync status of a corresponding data region; and
the processor further to update the plurality of sync state bits for write journaling, and change a sync state bit for a particular data region to show a synchronized status for the particular data region in response to decrementing a particular one of the I/O counters to zero outstanding host write operations for the particular data region.

16. The system of claim 15, wherein the processor is communicatively coupled to a storage controller that controls the virtual file volume.

17. The system of claim 15, wherein the processor is communicatively coupled to a host computer, wherein the command is received from the host computer.

18. The system of claim 15, wherein the first memory unit comprises a volatile memory unit.

19. The system of claim 15, wherein the second memory unit comprises a non-volatile memory unit.

20. The system of claim 15, wherein the processor is further to:
receive a virtual I/O command from a host computer, wherein the I/O command is to be written to the particular data region;
retrieve the particular one of the I/O counters in response to receiving the virtual I/O command;
set the sync state bit for the particular data region to a value indicating that the particular data region is no longer synchronized in response to receiving the virtual I/O command and in response to determining that the particular one of the I/O counters shows zero outstanding I/O operations; and increment by one the particular one of the I/O counters in response to determining that the particular one of the I/O counters shows a non-zero number of outstanding I/O operations.

\* \* \* \* \*